United States Patent [19]

Goodale et al.

[11] 4,084,030
[45] Apr. 11, 1978

[54] TEXTURED-FOAM COATED URETHANE WALL AND CEILING MATERIAL

[75] Inventors: Clark W. Goodale, Canoga Park; Charles W. Morgan, Rolling Hills; Albert L. Rhoton, Cypress, all of Calif.

[73] Assignee: United Foam Corporation, Compton, Calif.

[21] Appl. No.: 796,965

[22] Filed: May 16, 1977

Related U.S. Application Data

[60] Division of Ser. No. 743,169, Nov. 19, 1976, Pat. No. 4,049,848, which is a continuation-in-part of Ser. No. 532,315, Dec. 13, 1974, abandoned.

[51] Int. Cl.² .............................................. B32B 3/26
[52] U.S. Cl. .................................. 428/141; 428/310; 428/311; 428/315; 428/337; 428/339; 428/425
[58] Field of Search ............... 428/141, 310, 311, 315, 428/337, 339, 425; 427/276, 278, 358, 373

[56] References Cited

U.S. PATENT DOCUMENTS

| 2,906,643 | 9/1959 | Dennis | 427/373 |
|---|---|---|---|
| 2,981,360 | 4/1961 | Fritze et al. | 181/33 G |
| 2,994,110 | 8/1961 | Hardy | 181/33 G |
| 3,050,414 | 8/1962 | Reilly | 428/315 |
| 3,459,274 | 8/1969 | MacPhail, Sr. | 428/310 |
| 3,607,341 | 9/1971 | Goins et al. | 428/315 |
| 3,713,868 | 1/1973 | Gordon et al. | 428/310 |
| 3,752,695 | 8/1973 | Finelli | 428/310 |
| 3,856,614 | 12/1974 | Susuki et al. | 428/315 |

FOREIGN PATENT DOCUMENTS

| 974,809 | 5/1964 | United Kingdom | 428/310 |

Primary Examiner—William J. Van Balen
Attorney, Agent, or Firm—Blakely, Sokoloff, Taylor & Zafman

[57] ABSTRACT

A textured building material, suited for use as an acoustical wall and ceiling covering, comprising a cellular urethane foam substrate and an elastomeric coating and a method for its production is disclosed. The building material is flexible and damage resistant, which makes it especially useful in mobile vehicles and homes. The process consists of applying a foamed elastomeric resin emulsion onto a urethane substrate to a desired thickness; drying the coated substrate thus formed; and thereafter crushing the dried elastomeric coated substrate to form a composite textured material.

10 Claims, 3 Drawing Figures

U.S. Patent  April 11, 1978  4,084,030
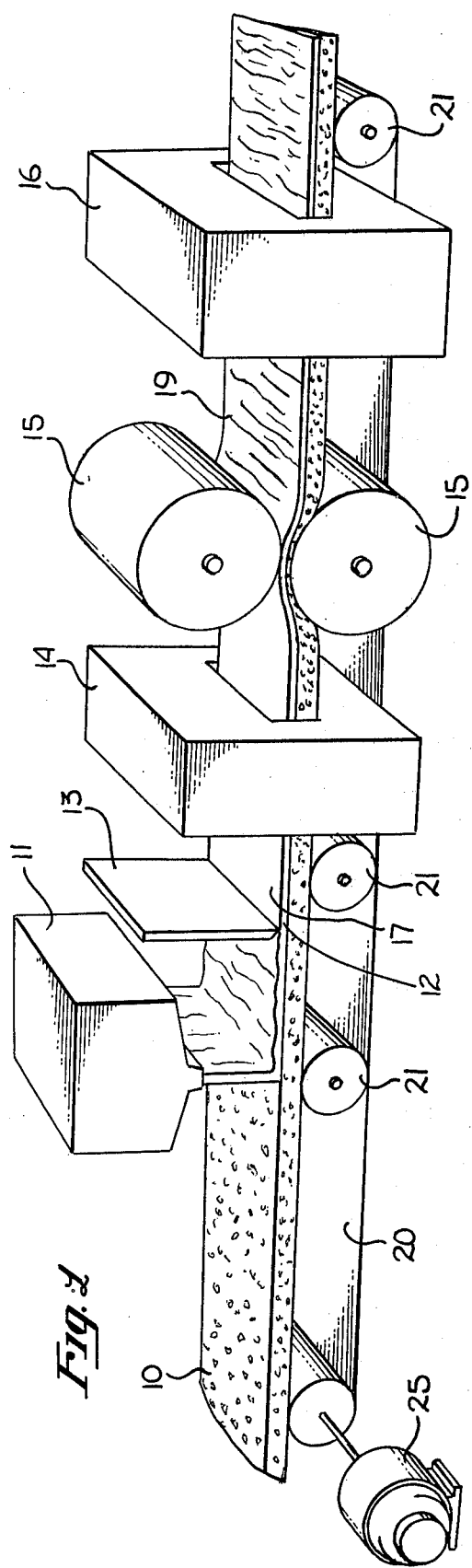
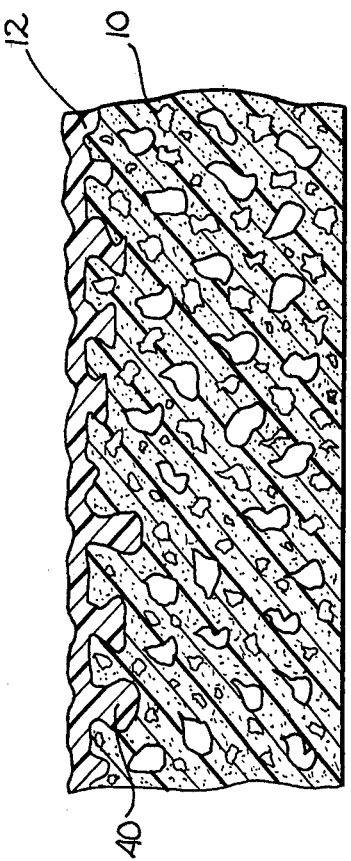
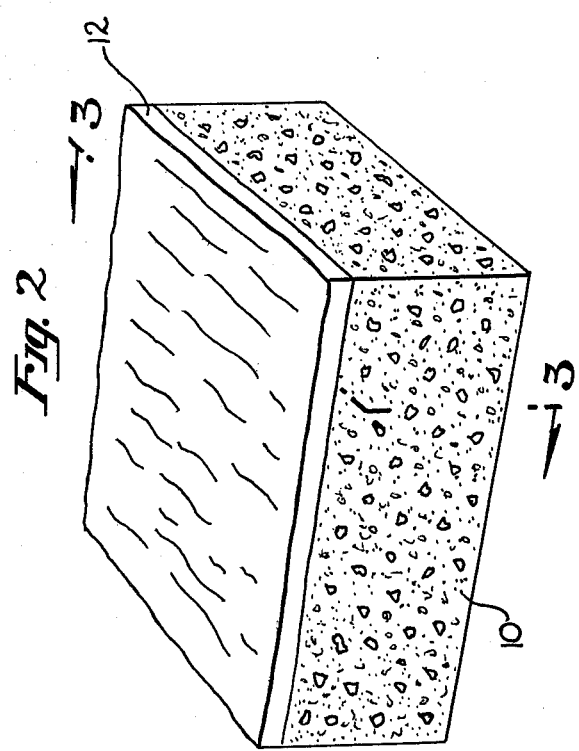

TEXTURED-FOAM COATED URETHANE WALL AND CEILING MATERIAL

CROSS-REFERENCE TO RELATED APPLICATION

This is a division of application Ser. No. 743,169, filed Nov. 19, 1976 now U.S. Pat. No. 4,049,848, which in turn is a continuation-in-part application of our application Ser. No. 532,315 filed Dec. 13, 1974, now abandoned.

BACKGROUND OF THE INVENTION

1. Field of the Invention

This invention relates generally to an improved building material, and more particularly to a wall and ceiling covering with the appearance of a sprayed on acoustical pattern for use in mobile homes and the like, and a method for its production.

2. Prior Art

Through the years, manufacturers of mobile homes have tried to develop construction methods and materials which would give the mobile home the appearance of an "on" site built home", and which would be able to withstand the physical stresses of moving the home from one site to another. For example, manufacturers have tried to duplicate the interior of a mobile home to look like the interior of any other on site built home especially in the areas of the wall and ceiling. Many have been successful in duplicating the appearance of a house except that the walls and ceiling of the mobile home has grooves or molding where the material used to form the walls or ceiling was joined. This detracts from the ability of the mobile home to give the impression that one is in an on site built home.

Many on site built homes have seamless ceilings and walls which have a pattern on them. One such pattern is sprayed on the ceiling with a pebbled appearance resembling plaster and is referred to in the trade as a "sprayed on acoustical pattern". Many attempts to produce this sprayed on acoustical pattern in mobile homes have been attempted without success. When a sprayed on acoustical ceiling of plaster has been applied in a mobile home, the desired seamless appearance is produced, but as soon as the mobile home was moved, the ceiling cracked which necessitated the replacement of the entire ceiling after each move.

Some maufacturers of modular homes (a home usually moved only once on a flatbed truck) have used a liquid plastic film material containing plastic chips to obtain a flexible seamless wall and ceiling covering. Because this system requires very expensive special preparation of the surface over which it is to be applied and considerable skill for its installation, it is not well suited for the mobile home industry. Another disadvantage is that the ceiling produced is not sufficiently resistant to the stresses which are inherent in moving a mobile home from place to place. Thus, cracks and seams would appear after a move which detracts from the appearance of the walls and ceiling.

Another prior art covering consists of a thin plastic film coated on one side with adhesive. The exposed side of the film has an appearance which approximates a shot acoustical ceiling. The covering is supplied in 12 foot wide continuous rolls and which enables a seamless appearance to be achieved. The film, however, lacks any appreciable "self-leveling" capacity and requires extensive preparation of the wall or ceiling prior to its application. All irregularities in the wall or ceiling, e.g., seams, cracks, etc., have to be puttied, taped, and sanded to provide a smooth surface. Any flaw in the covered surface would "telegraph through" the film. For example, each ceiling panel to be covered is required to be perfectly level with the adjacent panel as the film possess no self-leveling characteristics. A film is self-leveling when the surface of the film bonded to the wall or ceiling is able to deform sufficiently to prevent certain surface irregularities in the wall or ceiling from appearing on the exposed surface. Appearance of the flaw seen as an irregularity in the surface of the film is often described as "telegraph through" the film. Another major disadvantage of this material is that it cannot be repaired in a manner that the repair is undetectable.

As will be seen, the present invention is an improved building material and method which overcomes these prior art deficiencies.

SUMMARY OF THE INVENTION

The building material of the present invention comprises certain elastomeric coatings disposed on a urethane foam substrate. This invention relates to a method for producing the building material and the building material thus produced. More particularly, the method relates to the coating of a urethane foam substrate with an elastomeric material so that a durable, uniform, building material with the continuously textured appearance similar to that of an acoustical shot ceiling is produced. Thus, it is the object of this invention to provide a method for the production of a building material which is seamless, easily repairable, and damage resistant. A further object of this invention is to produce a building material which has the appearance of an acoustical shot ceiling. Yet, a further object of this invention is to provide a building material which may be used as an acoustical ceiling material in mobile homes and which is insulative, has good acoustical properties and is not subject to vibrational damages. Other objects and advantages of the instant invention will be readily apparent from the following descriptions and appendant claims.

Any ceiling or wall material when used in a mobile home, should have the following characteristics and properties: it should be easily repairable and the repairs should be undetectable; it should be resistant to weather damage and have good heat and light stability; it should have good acoustical and insulative properties as well as be aesthetically pleasing; and, finally, it should be flexible (so that it can be moved from place to place without cracking), easily installable and inexpensive.

The subject of this invention results from the unique combination of two types of materials, namely double cell urethane foam and foamed emulsions of elastomeric resins (such as, acrylic polymers; styrene-butadiene copolymers; nitrile rubber (e.g., acrylonitrile-butadiene-styrene); vinyl chloride-acrylic copolymers; vinylidene chloride-vinyl chloride copolymers; neoprene; and natural rubber) to produce a novel building material with all the aforementioned properties.

The manufacture of urethane foams and elastomeric coating per se are well-known in the art, as are their respective individual properties. Elastomeric materials are typically not self-leveling, nor are they particularly good insulative materials. Urethane foams are self-leveling, have good sound absorption properties, but tend to discolor from sunlight, are non-washable and difficult to color. Certain preferred elastomeric materials on the other hand (preferably acrylic materials) are light resistant and easily colorable. The specific combination of these different types of materials (i.e., double cell urethane foam and elastomeric coating) by the process hereinafter described, produces a novel composite building material with more advantages and features than are attributable to either material alone.

The preferred process for producing the invented building material, having properties and an appearance similar to that of a shot acoustical pattern, comprises; (a) depositing on a cellular urethane foam substrate, a desired thickness of an elastomeric foam coating which is produced by beating an emulsion of the elastomeric resin (with suitable additives) with air until it forms a froth that has the general appearance and spreading properties similar to that obtained in shaving cream dispensed from an aerosol container; (b) controlling the desired thickness and uniformity of the elastomeric coating to allow the formation of a textured surface after crushing; (c) drying the elastomeric coating without causing the elastomeric material to become fully cured or fully cross-linked; (d) crushing the dried elastomeric coated substrate, thereby forcing the elastomeric coating into the cells and pores on the adjacent surface of the urethane foam substrate. The crushing densifies the elastomeric coating into the cells and pores on the adjacent surface of the urethane foam substrate and causes partial compression or distortion of the substrate to produce a composite material which is pliable and which has a textured surface which is similar to that of an on site built shot acoustical ceiling.

The novel features which are believed to be characteristic of the invention, both as to its organization and method of operation, together with further objectives and advantages thereof, will be better understood from the following description considered in connection with accompanying drawings in which a presently preferred embodiment of the invention is illustrated by way of example. It is to be expressly understood, however, that the drawings are for the purpose of illustration and description only and not intended as a definition of the limits of the invention.

BRIEF DESCRIPTION OF THE DRAWINGS

FIG. 1 is a schematic diagram showing the preferred method by which the composite material of the present invention is made;

FIG. 2 is perspective view of the composite material of the present invention after it has been crushed to achieve the shot acoustical pattern;

FIG. 3 is an enlarged cross-sectional view of the composite material taken along line 3—3 of FIG. 2 showing the cell structure of the substrate material and the acrylic coating locked therein.

DESCRIPTION OF THE PREFERRED EMBODIMENT

Broadly, this invention relates to a method for producing a building material which has desirable acoustical properties and has a continuously textured surface, and the products produced therefrom. In FIG. 1 there is shown a schematic diagram which illustrates the method steps performed in the production of the composite material in the presently preferred embodiment.

Referring to FIG. 1, a self-supporting resilient cellular urethane foam substrate 10 is placed on conveyor means 20. The conveyor means is any well-known conventional conveyor system, for example, a continuous wide belt system for moving sheet type materials. The conveyor means is activated by conventional motor means 25 which causes rolls 21 to revolve. The rolls have sufficient friction on the belt to cause the belt to be driven forward. The conveyor means 20 carries the urethane foam substrate 10 under a foamed elastomeric material dispensing means 11 which forms a foamed elastomeric coating 12. In the presently preferred embodiment the dispensing means (e.g. a nozzle or the like) traverses the substrate and applies a stream of a foamed elastomeric emulsion composition thereto. The preferred technique involves dispensing the foamed elastomeric emulsion on the urethane substrate and then controlling the thickness of the foamed elastomeric material as it continues along the conveyor by passing the coated substrate under a skimming means. The skimming means may be a "doctor blade", or metal plate,, such that as the substrate and elastomeric foam pass through it, the foam is spread out or removed so as to achieve a desired predetermined thickness which will produce the desired texture after the coated substrate is fully processed. It is possible that the rate of traverse of the dispensing nozzle and the rate of foamed elastomeric material dispensed from the nozzle can be sufficiently controlled so that the desired thickness of coating 12 can be achieved without further skimming. Also, the elastomeric emulsion can be directly sprayed onto the urethane substrate 10 in a uniform desired thickness using a conventional commercial spraying apparatus.

The coated substrate thus formed is shown as composite material 17 in FIG. 1, which is then passed through a dryer means 14 to remove moisture from the composite material and allow partial cross-linking to occur. The presently preferred dryer means is a conventional hot air oven which allows the material on the conveyor to pass through it at a predetermined speed.

The composite material 17 then travels through roller means 15 and is crushed. The presently preferred roller means is a smooth cylindrical roller which can be adjusted to apply the required pressure to the composite material. The composite material is crushed so that the partially cured layer is densified and caused to be interlocked into the adjacent cells on the urethane substrate surfce which cells have been distorted by the crushing, the resultant partial compression and distortion of the elastomeric foam creating a continuous texture on the exposed surface thereof. A composite building material 19 with the desired shot acoustical pattern is, thus, formed from the smooth roller means 15. Without further treatment, the material can normally be stored in a relatively dry area for about 10 days to 3 weeks to allow the elastomeric coating to fully cross-link and cure in the pattern obtained after crushing. Optionally, material 19 may be passed through additional heating means 16 to further cure and cross-link the elastomeric coating. The formed material is then rolled and stored in a relatively dry area.

FIG. 2 is a perspective view of the presently preferred embodiment of the invention showing the building material 19. The foamed elastomeric coating 12 has been crushed into some of the adjacent surface cells of the urethane substrate 10. The deformation of the cells in the surface "locks" the acrylic resin to the substrate and produces a textured material that has the desired shot acoustical appearance.

FIG. 3 is an enlarged partial cross-sectional view of the building material 19. One can see that the foamed elastomeric coating 12 has formed a laminate layer or film on the urethane substrate 10, and has been forced into the cellular structure of the urethane. Cell 40 is a typical cell showing the interlocking action of the cell on the elastomeric coating that is achieved by crushing the coated substrate 17 as shown in FIG. 1 with the roller means 15. FIG. 3 illustrates the need for accurate cure and cross-linking control. If the foamed acrylic coating is completely cured prior to crushing, the desired interlocking effect shown by cell 40 will not be achieved. If the coating is insufficiently cured and then crushed, the effect can be a delamination of the elastomeric coating 12 from the substrate 10 when the curing is completed.

The specific polyurethane foam substrate 10, useful in the present invention, may be any self-supporting resilient double cell urethane foam (known in the prior art) which, when the foamed elastomeric coating 12 is crushed into the substrate, the elastomeric coating will form a continuous textured and discrete coating on the adjacent surface of the urethane substrate and will not detach therefrom. The thickness of the elastomeric material should be selected so that after crushing the cellular pattern of the adjacent substrate surface will cause the desired textured appearance on the exposed surface of the elastomeric layer. The texture obtained approximates the random cellular structure of the underlying surface of the substrate material. The term "urethane foam" substrate in the present invention is meant to include various known homopolymers and copolymers cross-linked with organic polyisocyanates forming urethane.

The presently preferred urethane foam substrate has a density of approximately 1–2.6 lbs. per cubic foot and is approximately ⅛ to ¾ inches thick. The substrate materials which have been found to yield the desired texture are, or resemble what is referred to in the trade as "sea sponge" foams or "double cell" foams and typically contain a major portion of cells which measure up to about 0.75 inches in their greatest dimension. The cells in the urethane substrate are of various sizes and shapes and randomly dispersed. The "larger" cells, i.e., cells greater than about 0.1 inches in the greatest dimension, occupy about 80% or more of the total volume of the substrate. The term "double cell" foam is often also referred to as "buckshot" foam and generally defines the presence of scattered cells in a urethane foam which are about two to four times larger than the typical uniform background cell diameter (see, "A Glossary of Urethane Industry Terms" by S. Alan Stewart and published by the Martin Sweets Company, Inc.). Typical formulations for the manufacture of sea sponge urethane foam having double cell structure, and the properties of such sea sponge foam, are known in the trade and are described, for example, in the "Journal of Cellular Plastics", Volume 11, No. 3, May/June 1975.

If necessary, in some instances the urethane substrate 10 may be cut to expose more of the interior cells enabling better contact between the foam coating and the cells in the substrate to achieve the desired textured pattern.

Various elastomeric materials have been found which achieve the desired result. The presently preferred elastomeric material is an acrylic coating which has the basic formulation set forth below in Example I:

EXAMPLE I

ACRYLIC LATEX

| Components | Parts by Weight | Weight % | Parts Solids Content* |
|---|---|---|---|
| A polymeric emulsion composition in water based on ethyl acrylate, acrylonitrile and methylolacrylamide (for example, RHOPLEX TR-621, manufactured by Rohm and Haas Company) | 100 | 43.02 | 55.0 |
| Sodium salts of a copolymer of maleic anhydride and diisobutylene (for example, TAMOL 731, manufactured by Rohm and Haas Company) | 1.6 | 0.7 | 0.4 |
| Titanium dioxide (rutile) for example, TITANOX RA-45 from Titanium Pigments Corp. of America | 12.5 | 5.38 | 12.5 |
| Aluminum hydrate | 55 | 23.67 | 55.0 |
| Melamine formaldehyde resin (for example, AEROTEX M-3 manufactured by American Cyanamid) | 2.3 | 0.99 | 1.8 |
| Emulsion copolymer of ethyl acrylate and methacrylic acid (for example ACRYSOL ASE-60 manufactured by Rohm and Haas Company) | 2.9 | 1.25 | 0.8 |
| Ammonium hydroxide (28%) | 2.0 | 0.86 | — |
| Ammonium stearate | 7.0 | 3.01 | 2.3 |
| Water | 49.1 | 21.12 | — |
| Total | 232.4 | 100.00 | 127.8 |

*Water and the ammonia (NH₃) gas given off by the ammonium hydroxide constitute all the non-solid portion of the above formulation of Example I.

In the above-described preferred emulsion formulation, the sodium salts of the copolymer of maleic anydride and diisobutylene are dispersants for the pigment; titanium dioxide is a pigment to give opacity and whiteness; aluminum hydrate is primarily for flame retardance; the melamine formaldehyde resin is a cross-linker for the polymeric composition; the emulsion copolymer of ethyl acrylate and methacrylic acid is a thickener; the ammonium hydroxide is used primarily for pH adjustment (i.e., above 9.5); and the ammonium stearate helps soften and stabilize the foam while acting as a foaming agent.

Other foamed acrylic resins may be used. Suitable acrylic resins for the coating may be formed from resins having about 0.3–1.5% itaconic acid; 40–70% ethyl acrylate; 2–6% butyl acrylate and 0–7% acrylonitrile. However, the preferred composition, recited above, when used on the preferred sea sponge type foam substrate previously discussed, yields a product with excellent over-all properties and a textured finish which has the appearance of a sprayed on acoustical pattern.

In addition to the preferred acrylic elastomeric resins, the following alternate elastomeric resin materials may also be used with satisfactory results: styrene-butadiene copolymer; acrylonitrile-butadiene-styrene terpolymer; vinyl chloride-acrylic copolymer; vinylidene chloride — vinyl chloride copolymer; neoprene (e.g. a copolymer of chloroprene and methacrylic acid or a homopolymer of chloroprene); and, natural rubber. Examples II – VIII, below set forth certain preferred alternate formulations using various elastomeric resin materials and suitable additives which can be used as a coating in the invented process to obtain the desired textured composite material.

The term "elastomeric" as it is used herein refers to a natural or synthetic high polymer having unique properties of deformation (elongation or yield under strain) and elastic recovery after cross-linking or vulcanization which, when used with the above-described urethane substrate in the presently described process, will provide the desired continuously textured finish and a flexible or yielding composite material that will not crack or peel when rolled for storage or when subjected to moving conditions such as when the material is used as a ceiling or wall material in a mobile or modular home.

The following are the presently preferred alternate elastomeric material formulations:

EXAMPLE II

STYRENE - BUTADIENE COPOLYMER LATEX LATEX (SBR OR S TYPE ELASTOMER)

| Components | Parts by Weight | Weight % | Parts Solids Content* |
|---|---|---|---|
| A polymeric emulsion composition in water based on styrene and butadiene. The ratio of these would be nominally 45% styrene and 55% butadiene. (for example, XD-3004.200 latex manufactured by Dow Chemical Co.) | 100.0 | 50.67 | 50.00 |
| Sodium salts of a copolymer of maleic anhydride and diisobutylene (for example, Tamol 731, manufactured by Rohm & Haas Co.) | 3.00 | 1.52 | .75 |
| Titanium dioxide (for example, Titanox R900 from E. I. Dupont) | 14.00 | 7.09 | 14.00 |
| Aluminum trihydrate | 33.35 | 16.90 | 33.35 |
| Melamine formaldehyde resin (for example, Aerotex M-3, manufactured by American Cyanamid) | 4.00 | 2.03 | 3.20 |
| Emulsion copolymer of ethyl acrylate and methacrylic acid (for example, Acrysol ASE60 manufactured by Rohm & Haas Co.) | 1.50 | .76 | .42 |
| Ammonium stearate | 10.00 | 5.07 | 3.00 |
| Water | 31.50 | 15.96 | -0- |
| Total | 197.35 | 100.00 | 104.72 |

*Water constitutes all the non-solid portion of the above formulation of Example II.

In the above-described preferred emulsion formulation, the sodium salt of the copolymer of maleic anhydride and diisobutylene are dispersants for the pigment; titanium dioxide is a pigment to give opacity and whiteness; aluminum trihydrate is primarily for flame retardance; the melamine formaldehyde resin is a cross-linker for the polymeric composition; the emulsion copolymer of ethyl acrylate and methacrylic acid is a thickener; and the ammonium stearate helps soften and stabilize the foam while acting as a foaming agent.

EXAMPLE III

ACRYLONITRILE-BUTADIENE-STYRENE TERPOLYMER: (NITRILE RUBBER)

| Components | Parts by Weight | Weight % | Parts Solids Content* |
|---|---|---|---|
| A polymeric emulsion composition in water based on acrylonitrile, butadiene and styrene. The polymer composition is nominally styrene 7%, acrylonitrile 30%, butadiene 62% (for example, Hycar 1572×45 Latex, manufactured by B.F. Goodrich Chemical Co.) | 100.00 | 45.45 | 50.00 |
| Sodium salts of a copolymer of maleic anhydride and diisobutylene (for example, Tamol 731, manufactured by Rohm & Haas Co.) | 3.00 | 1.37 | .75 |
| Titanium dioxide (rutile) (for example, Titanox RA-45 from Titanium Pigments Corp. of America | 14.00 | 6.36 | 14.00 |
| Aluminum Trihydrate | 55.00 | 25.00 | 55.00 |
| Melamine formaldehyde resin (for example, Aerotex M-3 manufactured by American Cyanamid) | 6.00 | 2.73 | 4.80 |
| Emulsion copolymer of ethyl acrylate and methacrylic acid (for example, Acrysol ASE-60 manufactured by Rohm & Haas Co.) | 3.00 | 1.36 | .84 |
| Ammonium stearate | 6.00 | 2.73 | 1.80 |
| Water | 33.00 | 15.00 | -0- |
| Total | 220.00 | 100.00 | 127.19 |

*Water constitutes all the non-solid portion of the above formulation of Example III.

In the above-described preferred emulsion formulation, the sodium salts of the copolymer of maleic anhydride and diisobutylene are dispersants for the pigment; titanium dioxide is a pigment to give opacity and whiteness; aluminum trihydrate is primarily for flame retardance; the melamine formaldehyde resin is a cross-linker for the polymeric composition; the emulsion copolymer of ethyl acrylate and methacrylic acid is a thickener; and the ammonium stearate helps soften and stabilize the foam while acting as a foaming agent.

EXAMPLE IV

VINYL CHLORIDE - ACRYLIC COPOLYMER

| Components | Parts by Weight | Weight % | Parts Solids Content* |
|---|---|---|---|
| A copolymer emulsion composition in water of vinyl chloride and acrylic latex of approximately 50% vinyl chloride and 50% acrylic., (for example, Geon 460×1 Latex manufactured by B.F. Goodrich Chemical Co.) | 100.00 | 62.50 | 50.00 |
| Sodium salts of copolymer of maleic anhydride and diisobutylene (for example, Tamol 731 manufactured by Rohm & Haas Co.) | 3.00 | 1.88 | .75 |
| Titanium dioxide (rutile) (for example, Titanox R900 from E. I. DuPont Co.) | 14.00 | 8.74 | 14.00 |
| Emulsion copolymer of ethyl acrylate and methacrylic acid (for example, Acrysol ASE-60 manufactured by Rohm & Haas Co.) | 3.00 | 1.88 | .84 |
| Ammonium hydroxide | 4.00 | 2.50 | — |
| Ammonium Stearate | 6.00 | 3.75 | 1.80 |
| Water | 30.00 | 18.75 | -0- |
| Total | 160.00 | 100.00 | 67.39 |

*Water and the ammonia (NH$_3$) gas given off by the ammonium hydroxide constitute all the non-solid portion of the above formulation of Example IV.

In the above-described preferred emulsion formulation, the sodium salt of the copolymer of maleic anhydride and diisobutylene are dispersants for the pigment; titanium dioxide is a pigment to give opacity and whiteness; the emulsion copolymer of ethyl acrylate and methacrylic acid is a thickener; the ammonium hydroxide is used primarily for pH adjustment (i.e., above 9.5); and the ammonium stearate helps soften and stabilize the foam while acting as a foaming agent.

EXAMPLE V
VINYLIDENE CHLORIDE-VINYL CHLORIDE COPOLYMER:

| Components | Parts by Weight | Weight % | Parts Solid Content* |
|---|---|---|---|
| A copolymer emulsion composition in water of vinylidene chloride and vinyl chloride latex. The nominal composition is 90% vinylidene chloride, 10% vinyl chloride. (for example, Geon 660×1 Latex manufactured by B.F. Goodrich Chemical Co.) | 100.00 | 62.50 | 51.00 |
| Sodium salts of a copolymer of maleic anhydride and diisobutylene (for example, Tamol 731, manufactured by Rohm & Haas Co.) | 3.00 | 1.88 | .75 |
| Titanium dioxide (rutile) (for example, Titanox R900 manufactured by E. I. DuPont Co.) | 14.00 | 8.75 | 14.00 |
| Emulsion copolymer of ethyl acrylate and methacrylic acid (for example Acrysol ASE-60 manufactured by Rohm & Haas Co.) | 3.00 | 1.88 | .84 |
| Ammonium stearate | 6.00 | 3.74 | 1.80 |
| Ammonium hydroxide | 4.00 | 2.50 | — |
| Water | 30.00 | 18.75 | -0- |
| Total | 160.00 | 100.00 | 68.39 |

*Water and the ammonia (NH$_3$) gas given off by the ammonium hydroxide constitute all the non-solid portion of the above formulation of Example V.

In the above-described preferred formulation, the sodium salt of the copolymer of maleic anhydride and diisobutylene are dispersants for the pigment; titanium dioxide is a pigment to give opacity and whiteness; the emulsion copolymer of ethyl acrylate and methacrylic acid is a thickener; the ammonium hydroxide is used primarily for pH adjustment (i.e., above 9.5); and the ammonium stearate helps soften and stabilize the foam while acting as a foaming agent.

EXAMPLE VI
NEOPRENE LATEX (COPOLYMER OF CHLOROPRENE AND METHACRYLIC ACID)

| Component | Parts by Weight | Weight % | Parts Solids Content* |
|---|---|---|---|
| Copolymer emulsion in water of chloroprene and methacrylic acid latex. (for example Neoprene Latex 101 manufactured by E. I. by DuPont Co.) | 100.00 | 57.55 | 46.00 |
| Malamine formaldehyde resin (for example Aerotex M-3 manufactured by American Cyanamid) | 5.00 | 2.88 | 4.00 |
| Aluminum trihydrate | 25.00 | 14.39 | 25.00 |
| Tricresyl Phosphate | 5.00 | 2.88 | 5.00 |
| Sodium sulfate of higher fatty alcohols (for example, Aquarex WAQ manufactured by E. I. DuPont Co.) | 3.00 | 1.72 | .30 |
| Disodium N-octodecyl sulfosuccinamate, 35% active, (for example, Aerosol 18 manufactured by American Cyanamid) | 2.50 | 1.44 | .88 |
| Sodium salt of polyacrylic acid, 12-13% active, (for example, Acrysol GS manufactured by Rohm & Haas Co.) | 5.00 | 2.88 | .62 |

EXAMPLE VI-continued
NEOPRENE LATEX (COPOLYMER OF CHLOROPRENE AND METHACRYLIC ACID)

| Component | Parts by Weight | Weight % | Parts Solids Content* |
|---|---|---|---|
| Pigment Dispersion | | | |
| Zinc oxide | 2.50 | | 2.50 |
| Antimony oxide | 2.00 | | 2.00 |
| Hindered phenol (or paraphenylenediamine) (for example, WINGSTAY-L manufactured by Goodyear Tire and Rubber Co.) | 1.20 | | 1.20 |
| Sodium salts of copolymer of maleic anhydride and diisobutylene (for example, TAMOL 73 manufactured by Rohm & Haas Co.) | 2.40 | | .60 |
| Titanium dioxide | 5.00 | | 5.00 |
| Water | 15.15 | | -0- |
| Pigment Dispersion Total | 28.25 | 16.26 | 11.30 |
| Total | 173.75 | 100.00 | 93.10 |

*Water constitutes all the non-solid portion of the above formulation of Example VI.

In the above-described preferred emulsion formulation, the sodium salts of the copolymer of maleic anhydride and diisobutylene and the sodium sulfate of the higher fatty alcohols are dispersants for the pigment; titanium dioxide is a pigment to give opacity and whiteness; aluminum trihydrate is primarily for flame retardance; the melamine formaldehyde resin is a cross linker for the polymeric composition; tricresyl phosphate reduces the flammability and softens the film; the sodium salt of polyacrylic acid is a thickening agent; disodium N-octodecyl sulfosuccinamate is a foaming aid; zinc oxide is an accelerator of cure; antimony oxide also reduces flammability; and hindered alcohol (or paraphenylenediamine) improves the aging properties of the finished product.

EXAMPLE VII
NEOPRENE LATEX HOMOPOLYMER OF CHLOROPRENE

| Components | Parts by Weight | Weight % | Parts Solid Content |
|---|---|---|---|
| Homopolymer emulsion in water of chloroprene (for example, Neoprene Latex 357 manufactured by E. I. DuPont Co.) | 100.00 | 48.77 | 61.00 |
| Aluminum trihydrate | 25.00 | 12.19 | 25.00 |
| Sodium sulfate of higher fatty alcohol (for example, Aquarex WAQ manufactured by E. I. DuPont Co.) | 3.00 | 1.46 | .30 |
| Disodium N-octodecyl sulfosuccinamate, 35% active, (for example, Aerosol 18 manufactured by American Cyanamid) | 3.00 | 1.46 | 1.05 |
| Sodium salt of polyacrylic acid, 12-13% active, (for example, Acrysol GS manufactured by Rohm & Haas Co.) | 6.00 | 2.93 | .75 |
| Water | 30.00 | 14.63 | -0- |
| Pigment Dispersion | | | |
| Zinc oxide | 3.00 | | 3.00 |
| Antimony oxide | 2.50 | | 2.50 |
| Hindered phenol (or paraphenylenediamine) (for example, WINGSTAY-L manufactured by Goodyear Tire and Rubber Co.) | 1.50 | | 1.50 |
| Sodium salts of copolymer of maleic anhydride and diisobutylene (for example, TAMOL 73 manufactured by Rohm & Haas Co.) | 4.00 | | 1.00 |
| Titanium oxide | 6.00 | | 6.00 |
| Thiocarbanilide or N,N' | | | |

EXAMPLE VII-continued
NEOPRENE LATEX
HOMOPOLYMER OF CHLOROPRENE

| Components | Parts by Weight | Weight % | Parts Solid Content |
|---|---|---|---|
| diphenylthiourea, 33% active (for example, available from Monsanto Chemical Co.) | 3.69 | | 1.22 |
| Water | 17.36 | | -0- |
| Pigment Dispersion | | | |
| Total | 38.05 | 18.56 | 15.22 |
| Total | 205.05 | 100.00 | 103.32 |

*Water constitutes all the non-solid portion of the above formulation of Example VII.

In the above-described preferred emulsion formulation, the sodium salts of the copolymer of maleic anhydride and diisobutylene and the sodium sulfate of higher fatty alcohol are dispersants for the pigment; titanium dioxide is a pigment to give opacity and whiteness; aluminum trihydrate is primarily for flame retardance; tricresyl phosphate improves the flammability and softens the polymer; disodium N-octodecyl sulfosuccinamate stabilizes the foam while acting as a foaming agent; the sodium salt of polyacrylic acid is a thickening agent; antimony oxide reduces flammability; the hindered alcohol (or paraphenylenediamine) improves the aging properties of the finished product; and thiocarbanilide is a cross-linking accelerator.

EXAMPLE VIII
NATURAL RUBBER LATEX

| Components | Parts by Weight | Weight % | Parts Solid Content* |
|---|---|---|---|
| Centrifuged Natural Rubber Latex, 62% solids | 100.00 | 47.25 | 62.00 |
| Aluminum trihydrate | 60.00 | 33.52 | 60.00 |
| Sodium sulfate of higher fatty alcohol (for example, Aquarex WAQ manufactured by E. I. DuPont Co.) | 5.00 | 2.36 | 5.00 |
| Disodium N-octodecyl sulfosuccinamate, 35% active, (for example, Aerosol 18 manufactured by American Cyanamid) | 4.00 | 1.90 | 1.40 |
| Methylcellulose | 10.00 | 4.73 | .50 |
| Pigment Dispersion | | | |
| Zinc oxide | .60 | | .60 |
| Antimony oxide | 2.50 | | 2.50 |
| zinc dibutyl-dithiocarbamate for example, available as Butyl Zimate from R. T. Vanderbilt Co., Inc.) | .10 | | .10 |
| Sulfur | | | |
| Hindered phenol or paraphenylenediamine (for example, Wingstay-L manufactured by Goodyear Tire and Rubber Co.) | 1.10 | | 1.10 |
| Sodium salts of copolymer of maleic anhydride and diisobutylene (for example, TAMOL 73 manufactured by Rohm & Haas Co.) | 1.50 | | 1.50 |
| Titanium Dioxide | 5.00 | | 1.25 |
| | 6.00 | | 6.00 |
| Pigment Dispersion | | | |
| Total | 32.62 | 15.41 | 13.05 |
| Total | 211.62 | 100.00 | 141.95 |

*Water constitutes all the non-solid portion of the above formulation of Example VIII.

In the above-described preferred latex formulation, the sodium salts of the copolymer of maleic anhydride and diisobutylene and the sodium sulfate of higher fatty alcohol are dispersants for the pigment; titanium dioxide is a pigment to give opacity and whiteness; aluminum trihydrate is primarily for flame retardance; disodium N-octodecyl sulfosuccinamate is a wetting agent which stabilizes and aid in the foaming; antimony oxide reduces the flammability; zinc dibutyldithiocarbamate and Zinc oxide speed the cure of the system; sulfur is a cross-linking agent; hindered phenol improves the long term aging properties of the product; and methylcellulose is a thickener.

It should be understood that the above-described preferred compositions could contain pigment colors (other than white) and other additives could be added to or substituted to obtain the desired properties. In general the elastomeric compositions used have about to 55% solids content by weight.

The method of making the invented composite material using the above-described elastomeric coatings will now be described in further detail.

The selected elastomeric resin composition is vigorously mixed or beaten until a foam or froth is produced which has the appearance and spreading properties much like that of an aerosol shaving cream. The elastomeric foam may be sprayed, or otherwise deposited on substrate 10 by a conventional foam dispensing means 11. In the preferred embodiment, the dispensing means travels back and forth across the substrate as it lays down the foamed elastomeric resin composition. To form a discrete coating of uniform height, it is usually desirable to skim the foam and spread it to a desired predetermined thickness by skimming means 13. The thickness is such as to permit the irregular cell structure of the underlying sea sponge substrate to affect the exposed surface of the foamed elastomeric layer in the subsequent crushing step so that after the coated substrate 17 is fully processed a continuous texture is formed on the exposed surface of the elastomeric foam layer. It has been found that a foamed elastomeric coating having a thickness of about 1/64 inch to 1/16 inch yields excellent results. In the presently preferred embodiment, a doctor blade 13 is set at the desired height across the conveyor. As the substrate proceeds beneath the blade, the foam 12 is spread out and forms a uniform coating on the substrate. The coated substrate thus formed, shown as component 17 in FIG. 1, comprises the double cell urethane substrate 10 and the foamed elastomeric composition 12 evenly distributed across the top of the urethane. If desired, an evenly distributed elastomeric foam coating can be obtained without skimming by controlled spraying of the coating onto the substrate or by carefully controlling the rate of traverse of the dispensing means and the quantity of foam dispensed. In any event, at the this stage, the elastomeric material on the substrate is still uncured and in its foamy, shaving cream-like state.

The coated substrate is then placed in dryer 14. The presently preferred equipment is a conventional hot air oven dryer utilizing medium velocity heated air of about 220° F to 300° F. The oven dryer may also be such that separate heating zones within the dryer are maintained within the range of about 220° to 300° F. The speed of the composite 17 through the dryer can vary and the selected speed is dependent on the temperature of the oven and the ambient conditions. It has been determined that in an eighty foot long tunnel oven, a speed of about 4 ft/min at 220° F; to 5 to 6 ft/min at 260° to 270° F; and 10 ft/min at 300° F yield excellent results for the materials described in Examples I to VIII. However, depending on the temperature, length of the oven, ambient conditions, and the speed of the material, it has been found that the composite material can remain in the above-described oven between about 4 to 25 minutes to obtain the desired curing conditions. If the composite passes through the dryer too quickly, the elastomeric material will be too soft and will not have the proper texture for the crushing step. If the composite is over-dried, the elastomeric material may become over cured. This latter condition will prevent proper embedding of the foamed acrylic in the urethane substrate during the crushing step. The time duration of the component in the oven and the oven temperature is, therefore, controlled such that only the desired degree of curing or cross-linking of the acrylic resin takes place. The oven temperature and speed of the coated material is also controlled to prevent the elastomeric foam from having excess moisture when it leaves the drying oven. The elastomeric material should retain sufficient malleability and tact, after drying, to enable the elastomeric foam to be embedded to the irregular double cell structure of the urethane foam substrate after it passes through the rollers 15. It has been found that the elastomeric coating must also hold the urethane substrate in a partial compression or distortion, at the same time permitting a certain amount of post crush substrate recovery in order to produce the overall desired continuous texture and appearance.

After the coated product is dried in drying means 14, it is cooled to about 60° F to 110° F prior to crushing. The cooled product is then sent between a pair of crushing means 15 which densify the foamed elastomeric coating into the adjacent cells in the surface of the urethane substrate, which cells have been previously filled with the elastomeric froth. The presently preferred roller pressure is at least about 75 to 80 pli (pounds per linear inch). The units "pli" are commonly used in the industry to define the force per linear dimension exerted on the material to be crushed or calendared between two rollers along the line defining the points of greatest compression of the material. Under the above-described conditions, there is sufficient force to distort the cells of the urethane substrate, and to densify the predetermined thickness of elastomeric material thereby producing the desired textured effect. Using the above-described sea sponge substrate, there is usually enough cell wall thickness to hold the cell in permanent distortion after crushing. It is the present understanding of the inventors that the malleable elastomeric material is physically interlocked into the urethane foam cells on the surface of the urethane substrate as the cells are deformed by the crushing means 15. The interlocking results in the cells holding the elastomeric material in partial compression and distortion which gives the exposed surface of the elastomeric material the desired texture. When the partially cured elastomeric layer is crushed, it also deforms the cells of the underlying urethane and becomes interlocked therein to prevent delamination of the elastomeric layer from the substrate. Other bonding between the substrate 10 and the elastomeric material 12 may also take place (e.g. dipole, Van de Waals, etc.) to some extent.

After crushing, the final composite building material 19 is produced except for the post-crushing cure or final cross-linking of the elastomeric material which can be accelerated somewhat, if desired, by placing the material 19 in an optional heating means, such as an oven 16. The finished material is then rolled into bales. If an oven 16 is not used for the final cure, the composite material 19 should be kept in a dry place for about 10 days to 2 weeks before usage to allow the elastomeric coating to adequately cure and permanently hold the continuous textured pattern formed in conjunction with the substrate 10.

Application of the building material 19 to a surface such as the inside of a mobile or modular home, is easily achieved. The wall or ceiling is cleaned and freed of any dirt or oil; an adhesive is applied thereto, followed by application of the building material 19. The elastomeric coating 12, thus, becomes the exposed or exterior surface, while the urethane substrate 10 is bonded directly to the wall or ceiling. The prior art problem of slight irregularities telegraphing through the covering is prevented as the urethane foam substrate is sufficiently flexible and resilient to cover the irregularities without any noticeable effect seen in the exposed textured elastomeric coating 12. The underlying urethane substrate 10 acts as a compressible insulation material while the elastomeric coating provides the user with the desired exterior shot acoustical pattern effect.

The building material thus produced, will not crack, chip or peel. It can be painted if desired, with conventional latex paints and washed. The material is also odorless, non-deteriorating, and resists fungus, mildew and insects. Minor rips, cuts or tears, or the like, can be patched or repaired by applying small amounts of their elastomeric material to the areas to be patched and then allowing such patched areas to cure. Because of the continuous textured surface such minor tears rips and cuts are not normally detectable and, therefore, the material can be easily repaired without detracting from the over-all desired appearance.

It should be understood that the final cure or cross-linking of the elastomeric coating should not take place until after the crushing step has taken place since it has been found there will be some tendency for the fully cured elastomeric material to leave the exterior of the cells of the urethane foam after crushing, thus, destroying the desired shot acoustical pattern and texture described above. Also, the finished composite material should not be exposed to excessive moisture prior to the final cure or cross-linking step since there is also a tendency for such moisture to cause the uncured or partially cured acrylic coating to leave the contour of the cells of the urethane foam substrate.

It should also be understood that while the application described in the preferred embodiment deals with a suitable material for mobile and modular homes and the like, the invented method and products have other applications as a building, construction or decorative material and the applications described herein are merely exemplary.

We claim:

1. A composite building material having a continuously textured surface comprising:
    (a) a resilient urethane foam substrate, said substrate having an irregular sea sponge cell structure; and
    (b) a cured elastomeric layer adjacent to and embedded in the cells of one surface of said substrate, said elastomeric layer having an exposed surface with a texture which approximates the cellular structure of the adjacent sea-sponge substrate surface.

2. The material of claim 1 in which said elastomeric layer is an acrylic material.

3. The material of claim 1 in which said elastomeric material is formed from a styrene-butadiene material.

4. The material of claim 1 in which said elastomeric material is formed from a nitrile rubber material.

5. The material of claim 1 in which said elastomeric material is formed from a vinyl chloride-acrylic material.

6. The material of claim 1 in which said elastomeric material is formed from a vinylidene chloride-vinyl chloride material.

7. The material of claim 1 in which said elastomeric material is formed from a neoprene material.

8. The material of claim 1 in which said elastomeric material is formed from a natural rubber material.

9. The material of claim 1 in which said urethane substrate is from 1/8 to 3/4 inch thick, has a density of from 1 to 2.6 lbs. per cubic foot and has randomly dispersed cells measuring up about 0.75 in the greatest dimension.

10. The material of claim 1 in which said cells in excess of about 0.1 inches occupy about 80% of the total volume of said substrate.

* * * * *

Disclaimer 4,084,030.—*Clark W. Goodale*, Canoga Park; *Charles W. Morgan*, Rolling Hills and *Albert L. Rhoton*, Cypress, Calif. TEXTURED-FOAM COATED URETHANE WALL AND CEILING MATERIAL. Patent dated Apr. 11, 1978. Disclaimer filed July 1, 1980, by the assignee, *United Foam Corporation*.

Hereby enters this disclaimer to claims 1–10, inclusive of said patent.

[*Official Gazette August 26, 1980.*]